(12) United States Patent
Usami

(10) Patent No.: US 8,009,336 B2
(45) Date of Patent: Aug. 30, 2011

(54) IMAGE READING APPARATUS

(75) Inventor: Masaru Usami, Toride (JP)

(73) Assignee: Canon Kabushiki Kaisha (JP)

( * ) Notice: Subject to any disclaimer, the term of this patent is extended or adjusted under 35 U.S.C. 154(b) by 647 days.

(21) Appl. No.: 12/047,581

(22) Filed: Mar. 13, 2008

(65) Prior Publication Data

US 2008/0225356 A1 Sep. 18, 2008

(30) Foreign Application Priority Data

Mar. 16, 2007 (JP) ................. 2007-068481

(51) Int. Cl.
*H04N 1/04* (2006.01)

(52) U.S. Cl. ........ 358/497; 358/483; 358/486; 358/471; 358/474; 358/444

(58) Field of Classification Search ........... 358/471, 358/474, 497, 494, 486, 400, 401, 483, 482, 358/475, 512–514, 505, 509, 500, 501, 404, 358/444; 250/208.1, 216, 234–236; 355/40, 355/41; 399/211, 212; 235/454; 382/312, 382/318, 319

See application file for complete search history.

(56) References Cited

U.S. PATENT DOCUMENTS 6,252,998 B1 * 6/2001 Tsai ..................... 382/298
6,473,205 B1 * 10/2002 Pepe ..................... 358/483

FOREIGN PATENT DOCUMENTS

JP 6-113112 A 4/1994
JP 2008219371 A * 9/2008

* cited by examiner

*Primary Examiner* — Cheukfan Lee
(74) *Attorney, Agent, or Firm* — Rossi, Kimms & McDowell LLP

(57) ABSTRACT

An image reading apparatus which can reduce a change of color balance due to the exchange of the optical unit. The image reading apparatus comprises an original glass plate on which an original is placed, and an optical unit adapted to move in parallel to the original glass plate below the original glass plate, the optical unit comprising an illumination light source adapted to illuminate the original placed on the original glass plate, and a charge coupled device adapted to read the reflected light from the original placed on the original glass plate, and the optical unit being exchangeable with a spare optical unit. The image reading apparatus retains thickness information of the original glass tableplate. The spare optical unit retains change information of an image resolution of the image reading apparatus due to a change of an optical path length of the spare optical unit replacing the optical unit.

4 Claims, 6 Drawing Sheets

| MAIN BODY No.0010 | IMAGE RESOLUTION (CTF VALUES) | | |
|---|---|---|---|
| THICKNESS OF ORIGINAL GLASS PLATE | R | G | B |
| +0.1mm | 60.8 | 81.1 | 76.0 |

| MAIN BODY No.0010 | IMAGE RESOLUTION (CTF VALUES) | | |
|---|---|---|---|
| THICKNESS OF ORIGINAL GLASS PLATE | R | G | B |
| +0.1mm | 60.8 | 81.1 | 76.0 |

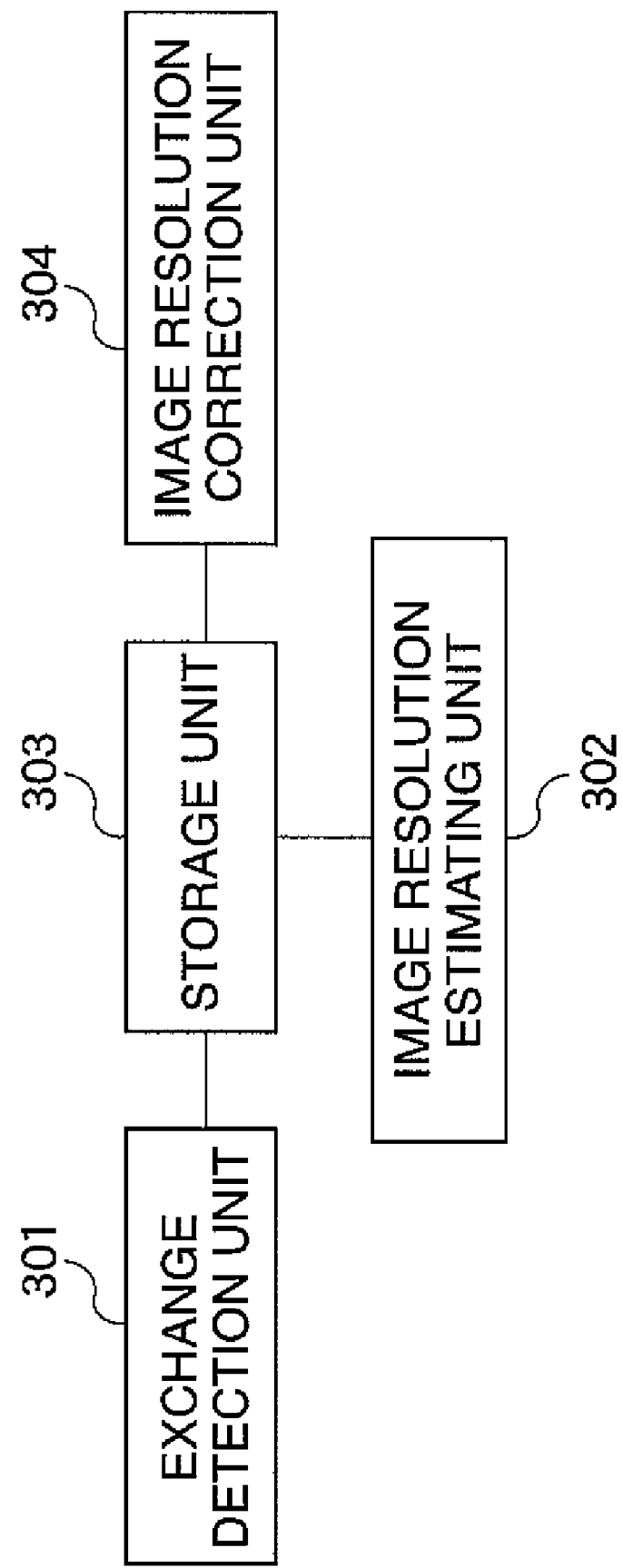

FIG. 4B

OPTICAL CHARACTERISTIC OF OPTICAL UNIT (CTF VALUES)

| THICKNESS OF ORIGINAL GLASS PLATE | R | G | B |
|---|---|---|---|
| -0.5 | 5.0 | 5.0 | 5.0 |
| -0.45 | 19.0 | 5.0 | 5.0 |
| -0.4 | 35.5 | 5.0 | 5.0 |
| -0.35 | 49.4 | 5.0 | 19.0 |
| -0.3 | 60.8 | 5.0 | 35.5 |
| -0.25 | 69.7 | 19.0 | 49.4 |
| -0.2 | 76.0 | 35.5 | 60.8 |
| -0.15 | 79.8 | 49.4 | 69.7 |
| -0.1 | 81.1 | 60.8 | 76.0 |
| -0.05 | 79.8 | 69.7 | 79.8 |
| 0 | 76.0 | 76.0 | 81.1 |
| 0.05 | 69.7 | 79.8 | 79.8 |
| 0.1 | 60.8 | 81.1 | 76.0 |
| 0.15 | 49.4 | 79.8 | 69.7 |
| 0.2 | 35.4 | 76.0 | 60.8 |
| 0.25 | 19.0 | 69.7 | 49.4 |
| 0.3 | 5.0 | 60.8 | 35.4 |
| 0.35 | 5.0 | 49.4 | 19.0 |
| 0.4 | 5.0 | 35.4 | 5.0 |
| 0.45 | 5.0 | 19.0 | 5.0 |

401 (indicates the -0.05 row)

FIG. 5B

OPTICAL CHARACTERISTIC OF
SPARE OPTICAL UNIT (CTF VALUES)

| THICKNESS OF ORIGINAL GLASS PLATE | R | G | B |
|---|---|---|---|
| −0.5 | 35.5 | 5.0 | 5.0 |
| −0.45 | 49.4 | 5.0 | 19.0 |
| −0.4 | 60.8 | 5.0 | 35.5 |
| −0.35 | 69.7 | 19.0 | 49.4 |
| −0.3 | 76.0 | 35.5 | 60.8 |
| −0.25 | 79.8 | 49.4 | 69.7 |
| −0.2 | 81.1 | 60.8 | 76.0 |
| −0.15 | 79.8 | 69.7 | 79.8 |
| −0.1 | 76.0 | 76.0 | 81.1 |
| −0.05 | 69.7 | 79.8 | 79.8 | ～501
| 0 | 60.8 | 81.1 | 76.0 |
| 0.05 | 49.4 | 79.8 | 69.7 |
| 0.1 | 35.4 | 76.0 | 60.8 |
| 0.15 | 19.0 | 69.7 | 49.4 |
| 0.2 | 5.0 | 60.8 | 35.4 |
| 0.25 | 5.0 | 49.4 | 19.0 |
| 0.3 | 5.0 | 35.4 | 5.0 |
| 0.35 | 5.0 | 19.0 | 5.0 |
| 0.4 | 5.0 | 5.0 | 5.0 |
| 0.45 | 5.0 | 5.0 | 5.0 |

IMAGE READING APPARATUS

BACKGROUND OF THE INVENTION

1. Field of the Invention

The present invention relates to an image reading apparatus, and more particularly, to an image reading apparatus which images image information of an original on a charge coupled device (CCD) through an imaging lens and causes the CCD to read the image information.

2. Description of the Related Art

There is conventionally known an image reading apparatus which reads image information of an original and the like with a CCD sensor for three RGB colors, or the like by line-scanning in a sub-scanning direction (see Japanese Laid-Open Patent Publication (Kokai) No. H06-113112, for example).

Such an image reading apparatus may have an SLA (SELFOC (Trade Mark) lens array) used as an imaging lens in many cases. It is generally known that the SLA has a characteristic of a narrow depth of field.

This image reading apparatus comprises an original glass plate on which an original is placed, a shaft disposed below the original glass plate in parallel thereto and directed in a sub-scanning direction, and an optical unit which moves on this shaft. The optical unit comprises an illumination light source which illuminates the original placed on the original glass plate, a CCD sensor, and an imaging lens which images the reflected light from the original placed on the original glass plate on the CCD sensor.

From the viewpoint of the construction of this image reading apparatus, an image resolution (CTF values) cannot be adjusted in a state that the optical unit is mounted on to a main body of the image reading apparatus body, and hence, severe management of a standard of a thickness of the original glass plate used causes deterioration of the image resolution to be reduced.

However, when the optical unit is exchanged during normal use, there is a problem that the variable thickness of the original glass plate based on an individual difference between the image reading apparatuses causes the imaging position to shift, thereby allowing the image resolution (CTF values) to change between before and after exchange of the optical unit.

A change of the CTF values due to such exchange of the optical units causes deterioration of the color reproducibility of the original, particularly in color.

SUMMARY OF THE INVENTION

The present invention provides an image reading apparatus which can reduce a change of color balance due to the exchange of the optical unit.

In an aspect of the present invention, there is provided an image reading apparatus comprising an original glass plate on which an original is placed, and an optical unit adapted to move in parallel to the original glass plate below the original glass plate, the optical unit comprising an illumination light source adapted to illuminate the original placed on the original glass plate, and a charge coupled device adapted to read the reflected light from the original placed on the original glass plate, and the optical unit being exchangeable with a spare optical unit, wherein the image reading apparatus retains thickness information of the original glass plate, and the spare optical unit retains change information of an image resolution of the image reading apparatus due to a change of an optical path length of the spare optical unit replacing the optical unit.

The image reading apparatus further can comprise an exchange detection unit adapted to detect that the optical unit has been exchanged for the spare optical unit, a storage unit adapted to store thickness information of the original glass plate, and change information of the image resolution, a resolution estimating unit adapted to estimate an image resolution after the exchange of the optical unit based on the thickness information of the original glass plate and the change information of the resolution which are stored in the storage unit, and a resolution correction unit adapted to correct the image resolution of the image reading apparatus on the basis of the image resolution estimation result by the resolution estimating unit.

The resolution correction unit can be adapted to correct the image resolution of the image reading apparatus so that the other colors are identical in image resolution with the color with the lowest image resolution among a plurality of colors.

The resolution correction unit can be adapted to correct the image resolution of the image reading apparatus so as to match with that before the exchange of the optical unit.

According to the image reading apparatus of the present invention, an optical unit comprising an illumination light source which illuminates an original placed on an original glass plate, and a charge coupled device (CCD) which reads reflected light from the original placed on the original glass plate is exchangeable with a spare optical unit, the image reading apparatus retains thickness information of the original glass plate, and the spare optical unit retains change information of the image resolution due to a change of an optical path length of the optical unit after the exchange.

With this arrangement, it is possible to reduce a change of color balance due to the exchange of the optical unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 3 is a block diagram illustrating a functional construction of the image reading apparatus in FIG. 1.

FIG. 4B is a diagram illustrating a unit label 401 which diagrammatizes the optical characteristic (CTF values) of the optical unit in FIG. 4A.

FIG. 5B is a diagram illustrating a unit label 501 which diagrammatizes the optical characteristic (CTF values) of the spare optical unit in FIG. 5A.

DETAILED DESCRIPTION OF THE PREFERRED EMBODIMENTS

Preferred embodiments of the present invention will be now described in detail with reference to the drawings.

Figures 1, 2:
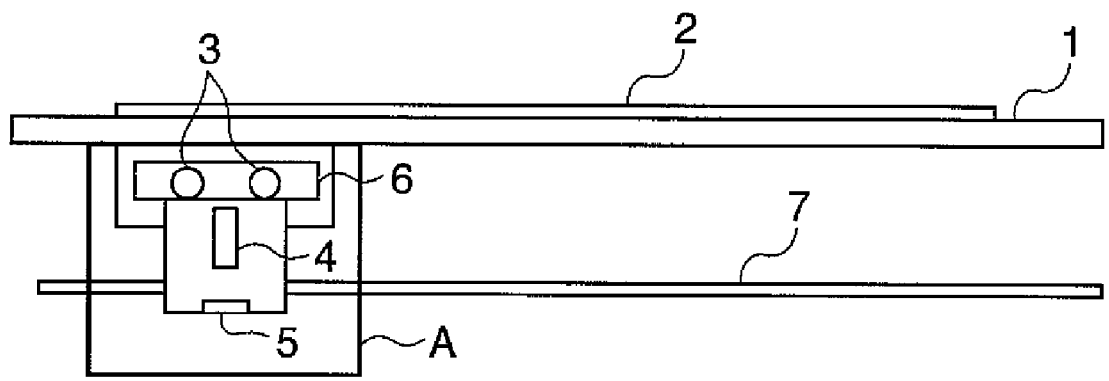
FIG. 1 is a view schematically illustrating an arrangement of an image reading apparatus according to an embodiment of the present invention.
FIG. 2 is a view illustrating the contents of a body label attached to a main body of the image reading apparatus body in FIG. 1.

FIG. 1 is a view schematically illustrating an arrangement of an image reading apparatus according to an embodiment of the present invention.

In FIG. 1, this image reading apparatus comprises an original glass plate 1 on which an original 2 is placed, a shaft 7 disposed below the original glass plate 1 in parallel thereto and directed in a sub-scanning direction, and an optical unit A which moves on this shaft 7. The optical unit A comprises an illumination light source 3 which illuminates the original placed on the original glass plate 1, a CCD sensor 4, and an imaging lens 5 which images the reflected light from the original placed on the original glass plate 1 on the CCD sensor 4.

The CCD sensor 4 reads an image which is imaged by the imaging lens 5.

In addition, the optical unit A comprises a spacer 6 for maintaining a constant positional relationship between the illumination light source 3 and the original glass plate 1.

The optical unit A is adapted to read an entire area of the original 2, while moving on the shaft 7 in the sub-scanning direction.

The image information read by the CCD sensor 5 is converted into an electric signal, and then the electric signal may be transmitted to an output device (not shown) and then outputted as a print output therethrough, or the image information may be transmitted to a memory storage and then stored therein.

A main body of this image reading apparatus has attached thereto a body label in FIG. 2 to be described hereinafter.

FIG. 2 is a view illustrating the contents of a body label attached to a main body of the image reading apparatus in FIG. 1.

In FIG. 2, a body label 201 describes thickness information of the original glass plate 1 and change information of the image resolution due to a change of an optical path length of the optical unit A as information on the image resolution. The thickness of the original glass plate 1 is described as a deviation between a design nominal thickness and an actual thickness of the original glass plate 1. The body label 201 is packed together at the time of shipping of the image reading apparatus.

Figure 4A:
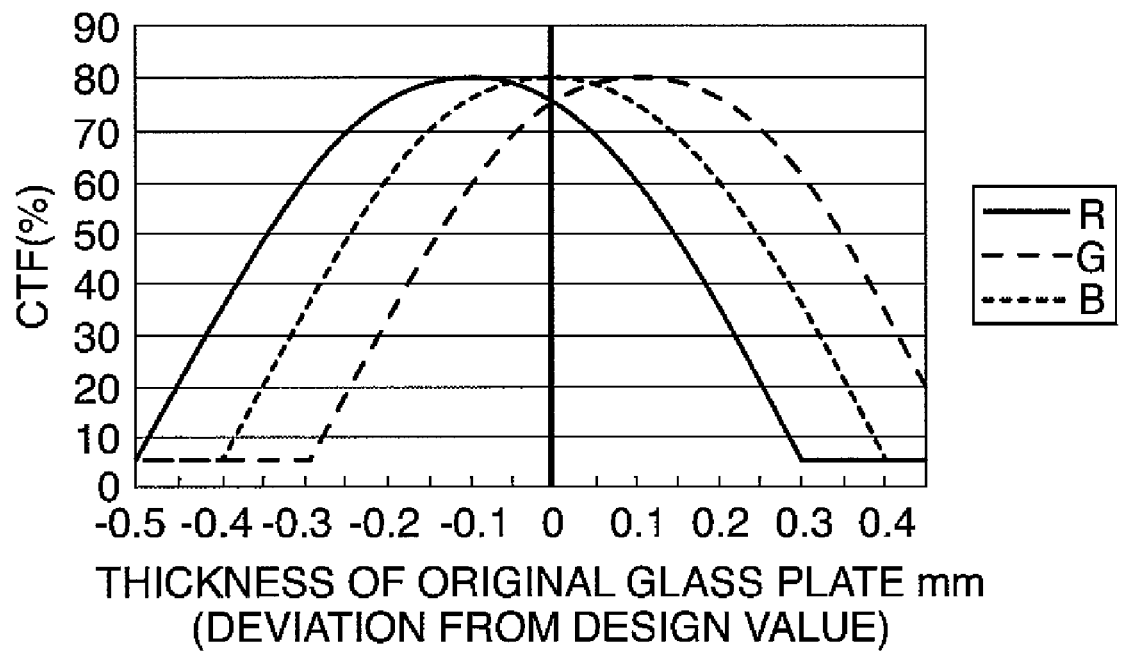
FIG. 4A is a graph illustrating an optical characteristic (CTF values) of an optical unit mounted on to the image reading apparatus.

FIG. 4A is a graph illustrating an optical characteristic (CTF values) of an optical unit mounted on to the image reading apparatus in FIG. 1, and FIG. 4B is a diagram illustrating a unit label 401 which diagrammatizes the optical characteristic (CTF values) of the optical unit in FIG. 4A.

Each of FIGS. 4A and 4B represents an optical characteristic (CTF values) exhibited when thickness of the original glass plate is changed increasingly or decreasingly in the optical path length-wise direction with the nominal design value as a reference point (0).

For example, when the thickness of the original glass plate of the image reading apparatus is +0.1 mm thicker than the nominal design value, each of FIGS. 4A and 4B shows R:60.8%, G:81.1%, and B:76.0% as the CTF values of the image reading apparatus.

Further, after the optical unit A then mounted is detached, the spare optical unit A is newly mounted on to the image reading apparatus. This mounted spare optical unit A has packed together a unit label 501 in FIG. 5B to be described hereinafter.

Figure 5A:
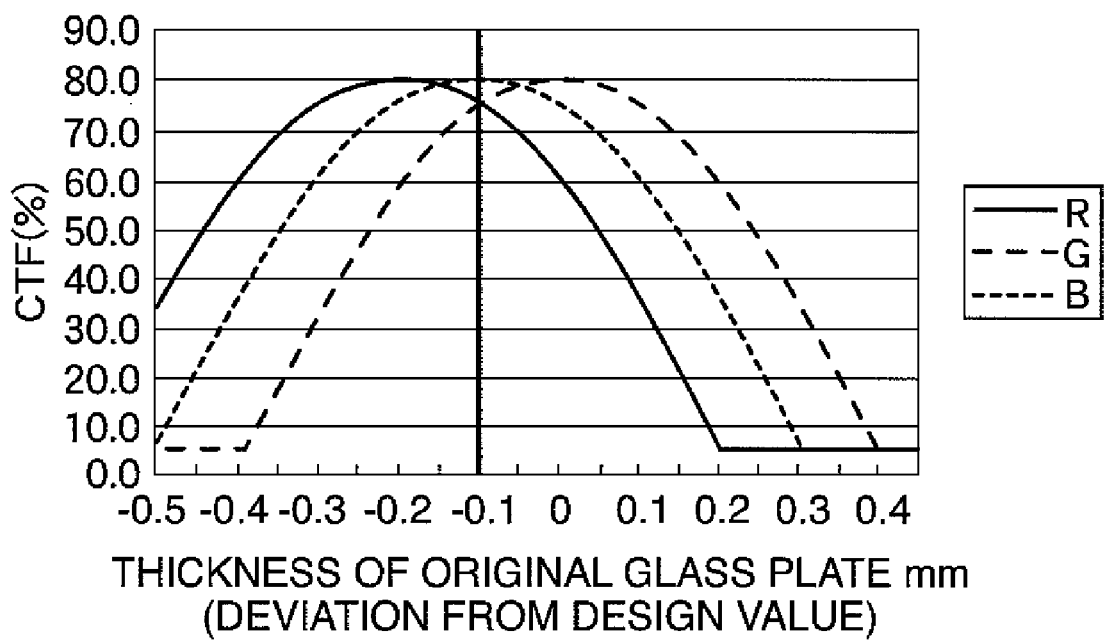
FIG. 5A is a graph illustrating an optical characteristic (CTF values) of a spare optical unit to be newly mounted.

FIG. 5A is a graph illustrating an optical characteristic (CTF values) of the spare optical unit to be is newly mounted, and FIG. 5B is a diagram illustrating a unit label 501 which diagrammatizes the optical characteristic (CTF values) of the spare optical unit in FIG. 5A.

If this spare optical unit A is exchanged for the optical unit A of the image reading apparatus of which original glass plate being +0.1 mm thicker than the nominal design value, the CTF values are estimated to be R: 35.4%, G: 76.0%, and B: 60.8%.

When the optical unit A is exchanged during normal use, an operator first confirms a thickness of the original glass plate 1 with reference to the body label 201 (FIG. 2) on the image reading apparatus of which optical unit A is required to be exchanged. Then, the CTF values of the image reading apparatus after the exchange are estimated based on the optical characteristic of the spare optical unit A described in the unit label 501 (FIG. 5B) which is packed together with the spare optical unit A.

In this case, the body label 201 describes "0.1" in a field of the thickness of the original glass plate (FIG. 2); therefore, referring values in a row of the unit label 501 (FIG. 5B) corresponding to "0.1" in a field of the thickness of the original glass plate shows that the CTF values of R, G, and B after the exchange are estimated to be R: 35.4%, G: 76.0%, and B: 60.8%.

The operator who exchanges the optical unit A selects a CTF value of a color with the lowest image resolution among a plurality of colors from the obtained CTF values of R, G, and B, and calculates correction factors in other colors so that the other colors are identical in CTF value with the color with the lowest image resolution, respectively. Hereinafter, a method of calculating the correction factors will be described with some examples.

When the CTF values of R, G, and B after the exchange of the optical unit A of the image reading apparatus are R:35.4%, G:76.0%, and B:60.8% respectively, the lowest CTF value exhibits R:35.4%.

The correction factors of the CTF values of G and B for adjustment to the CTF value of R are represented below.

Correction factor of G=CTF value of R/CTF value of G=35.4/76.0=0.4658

Correction factor of B=CTF value of R/CTF value of B=35.4/60.8=0.5822

The operator who exchanged the optical unit A inputs into the image reading apparatus the correction factors of the respective colors calculated above. The correction factor of the color with the lowest image resolution in the estimated CTF values of the respective colors of the image reading apparatus after the exchange of the optical unit A is 1.0.

If the CTF values are not corrected, exchanging the optical unit A causes the CTF values of R, G, and B to be applied as they are, which allows the color balance of the original to be deteriorated according to the differences of the CTF values. However, correction of the CTF values reduces a change of the color balance due to the exchange of the optical unit A.

In the above description, there is exemplified a method of calculating the correction factors with the color having the lowest estimated CTF value as a reference.

A method will be described hereinafter of correcting the CTF values of the image reading apparatus with the already exchanged optical unit A so as to match with the CTF values of the image reading apparatus with the not-yet-exchanged optical unit, which CTF values are described in the body label 201 (FIG. 2).

As mentioned above, the CTF values of the image reading apparatus on which the spare optical unit A having attached thereto the unit label 501 in FIGS. 5A and 5B are R: 35.4%, G: 76.0%, and B: 60.8%.

On the other hand, the CTF values of the image reading apparatus with the not-yet-exchanged optical unit A, which CTF values are described in the body label 201 (FIG. 2), are R:60.8%, G:81.1%, and B:76.0%.

Correction factors of CTF values determined from this relationship are represented below.

Correction factor of CTF value of R=CTF value of R before exchange/Estimated CTF value of R after exchange=60.8/35.4=1.718

Correction factor of CFT value of G=CTF value of G before exchange/Estimated CTF value of G after exchange=81.1/76.0=1.0671

Correction factor of CTF value of B=CTF value of B before exchange/Estimated CTF value of B after exchange=76.0/60.8=1.2500

If the CTF values are not corrected, exchanging the optical unit A causes the CTF values of R, C, and B to be applied as they are, which allows the color balance of the original to be deteriorated according to the differences of the CTF values. However, correction of the CTF values reduces a change of the color balance due to the exchange of the optical unit A.

All the above-mentioned CTF value correcting functions may be executed by the image reading apparatus, which makes it possible to reduce the operator's burden.

The CTF value correcting functions of the image reading apparatus according to this embodiment will be described hereinafter.

FIG. 3 is a block diagram illustrating functional construction of the image reading apparatus in FIG. 1.

In FIG. 3, this image reading apparatus comprises an exchange detection unit 301, an image resolution estimating unit 302 connected to this exchange detection unit 301, and a storage unit 303 and an image resolution correction unit 304 connected to the image resolution estimating unit 302, respectively.

The exchange detection unit 301 detects that the optical unit A has been exchanged. The storage unit 303 stores the contents (thickness information on the original glass plate 1) of the body label 201 in FIG. 2, and the contents (an optical characteristic of the exchange unit; change information of image resolution) of the unit label 501 in FIG. 5.

The image resolution estimating unit 302 estimates an image resolution realized after the exchange of the optical unit based on the thickness information on the original glass plate 1 in the body label 201 and the change information of the image resolution in the unit label 501 which are stored in the storage unit 303.

On the basis of the image resolution estimation obtained result by the image resolution estimating unit 302, the image resolution correction unit 304 corrects the image resolution of the image reading apparatus so as to match with that before the exchange of the optical unit. Otherwise, the resolution correction unit 304 may correct the image resolution of the image reading apparatus while calculating correction factors in other colors so that the other colors are identical in CTF value with the color with the lowest image resolution, respectively.

The image reading apparatus according to the present embodiment, a main body of the apparatus retains thickness information on the original glass plate 1, and the spare optical unit A retains change information of the image resolution (CTF values) due to the change of the optical path length of the optical unit A exhibited by the exchange of the optical unit, which attains the intended object.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-068481 filed Mar. 16, 2007, which is hereby incorporated by reference herein in its entirety.

What is claimed is:

1. An image reading apparatus comprising:
    an original glass plate on which an original is placed; and
    an optical unit adapted to move in parallel to said original glass plate below said original glass plate, said optical unit comprising an illumination light source adapted to illuminate the original placed on said original glass plate, and a charge coupled device adapted to read the reflected light from the original placed on said original glass plate, and said optical unit being exchangeable with a spare optical unit,
    wherein said image reading apparatus retains thickness information of said original glass plate, and
    wherein said spare optical unit retains change information of an image resolution of said image reading apparatus due to a change of an optical path length of said spare optical unit replacing said optical unit.

2. An image reading apparatus according to claim 1, further comprising:
    an exchange detection unit adapted to detect that said optical unit has been exchanged for said spare optical unit;
    a storage unit adapted to store thickness information of said original glass plate, and change information of said image resolution;
    a resolution estimating unit adapted to estimate an image resolution after the exchange of said optical unit based on the thickness information of said original glass plate and the change information of said resolution which are stored in said storage unit; and
    a resolution correction unit adapted to correct the image resolution of said image reading apparatus on the basis of the image resolution estimation result by said resolution estimating unit.

3. An image reading apparatus according to claim 2, wherein said resolution correction unit is adapted to correct the image resolution of said image reading apparatus so that other colors are identical in image resolution with a color with the lowest image resolution among a plurality of colors.

4. An image reading apparatus according to claim 2, wherein said resolution correction unit is adapted to correct the image resolution of said image reading apparatus so as to match said spare optical unit with that said optical unit being replaced.

* * * * *